(12) United States Patent
Chen et al.

(10) Patent No.: US 9,794,329 B2
(45) Date of Patent: Oct. 17, 2017

(54) CLOUD APPLICATION WITH SECURE LOCAL ACCESS

(71) Applicants: Zhigao Chen, Singapore (SG); Qiushi Wang, Singapore (SG); Lin Cao, Singapore (SG)

(72) Inventors: Zhigao Chen, Singapore (SG); Qiushi Wang, Singapore (SG); Lin Cao, Singapore (SG)

(73) Assignee: SAP SE, Walldorf (DE)

( * ) Notice: Subject to any disclaimer, the term of this patent is extended or adjusted under 35 U.S.C. 154(b) by 43 days.

(21) Appl. No.: 14/555,687

(22) Filed: Nov. 28, 2014

(65) Prior Publication Data

US 2016/0156700 A1   Jun. 2, 2016

(51) Int. Cl.
*H04L 29/08* (2006.01)
*H04L 29/06* (2006.01)
*H04W 4/00* (2009.01)

(52) U.S. Cl.
CPC .............. *H04L 67/10* (2013.01); *H04L 63/10* (2013.01); *H04W 4/003* (2013.01)

(58) Field of Classification Search
CPC ......... H04L 67/10; H04L 63/10; H04L 67/02; H04L 67/16; H04L 67/42
See application file for complete search history.

(56) References Cited

U.S. PATENT DOCUMENTS

| | | | | |
|---|---|---|---|---|
| 9,055,407 B1 * | 6/2015 | Riemer | ............. | H04M 1/72569 |
| 9,117,061 B1 * | 8/2015 | Sokolov | .................... | H04L 9/00 |
| 2011/0231936 A1 * | 9/2011 | Williams | .............. | G06F 21/577 726/25 |
| 2012/0216133 A1 * | 8/2012 | Barker | .................. | G06F 21/629 715/760 |
| 2013/0047223 A1 * | 2/2013 | Headley | .............. | H04L 63/0838 726/5 |
| 2013/0151314 A1 * | 6/2013 | Kugler | ............... | G06Q 30/0201 705/7.32 |
| 2014/0115487 A1 * | 4/2014 | Sandler | ............... | H04M 1/7253 715/740 |
| 2014/0149794 A1 * | 5/2014 | Shetty | ................. | H04L 67/1095 714/20 |
| 2014/0337491 A1 * | 11/2014 | Barreto | ............. | G06F 17/30194 709/221 |
| 2015/0012763 A1 * | 1/2015 | Cohen | ................... | H04L 67/125 713/310 |
| 2015/0120501 A1 * | 4/2015 | Jung | ....................... | H04L 63/10 705/26.41 |
| 2015/0244704 A1 * | 8/2015 | Morrissey | ........... | H04L 63/0815 726/8 |

(Continued)

*Primary Examiner* — Mohammad A Siddiqi

(57) ABSTRACT

A framework for cloud applications with fast secured local access is described herein. In accordance with one aspect, a cloud application (App) on an application server on a cloud is provided. The cloud application includes a dispatcher having location information of a local resource on a local server required by the App. The dispatcher may be loaded onto an end-user device in response to a user accessing the cloud application from a browser on the end-user device on a local network. A request for the local resource may be issued to the local server by the dispatcher on the end-user device. A result of the request may be received from the local server by the dispatcher on the end-user device, and displayed on the browser.

20 Claims, 6 Drawing Sheets

(56) References Cited

U.S. PATENT DOCUMENTS

| | | | | |
|---|---|---|---|---|
| 2015/0295892 A1* | 10/2015 | Fox | ............... | H04W 12/06 |
| | | | | 726/15 |
| 2015/0347119 A1* | 12/2015 | Wang | ............... | G06F 8/65 |
| | | | | 717/120 |
| 2016/0034267 A1* | 2/2016 | Wetzold | ............ | G06F 8/71 |
| | | | | 717/172 |
| 2016/0042303 A1* | 2/2016 | Medina | .......... | G06Q 10/02 |
| | | | | 705/5 |

* cited by examiner

US 9,794,329 B2

CLOUD APPLICATION WITH SECURE LOCAL ACCESS

TECHNICAL FIELD

The present disclosure relates generally to a framework for cloud applications (Apps) with fast secure local access.

BACKGROUND

Apps are developed for a wide variety of purposes. For example, a cloud App may reside on a cloud. A cloud App, for example, is accessed through a browser on an end-user device. The cloud app may utilize resources. The resources may reside on the cloud or on a remote server on a local network. For example, the remote server is part of the cloud. Providing resources on a remote or local server may be for security reasons. However, browsers cannot directly access another server simultaneously. In order to access another server, a cloud connector is needed. The use of cloud connectors, although enables connections directly to another server at the same time, requires complicated set up procedures and is computing intensive. This causes extra load at the servers on the cloud and local network, resulting in delays and slow response by the App.

From the foregoing discussion, it is desirable to provide effective and efficient access of remote or local resources by a cloud App.

SUMMARY

A framework for cloud applications with fast secured local access is described herein. In accordance with one aspect, a cloud application (App) on an application server on a cloud is provided. The cloud application includes a dispatcher having location information of a local resource on a local server required by the App. The dispatcher may be loaded onto an end-user device in response to a user accessing the cloud application from a browser on the end-user device on a local network. A request for the local resource may be issued to the local server by the dispatcher on the end-user device. A result of the request may be received from the local server by the dispatcher on the end-user device, and displayed on the browser.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures. Like reference numerals in the figures designate like parts.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent or being separate in their performance.

Figure 1:
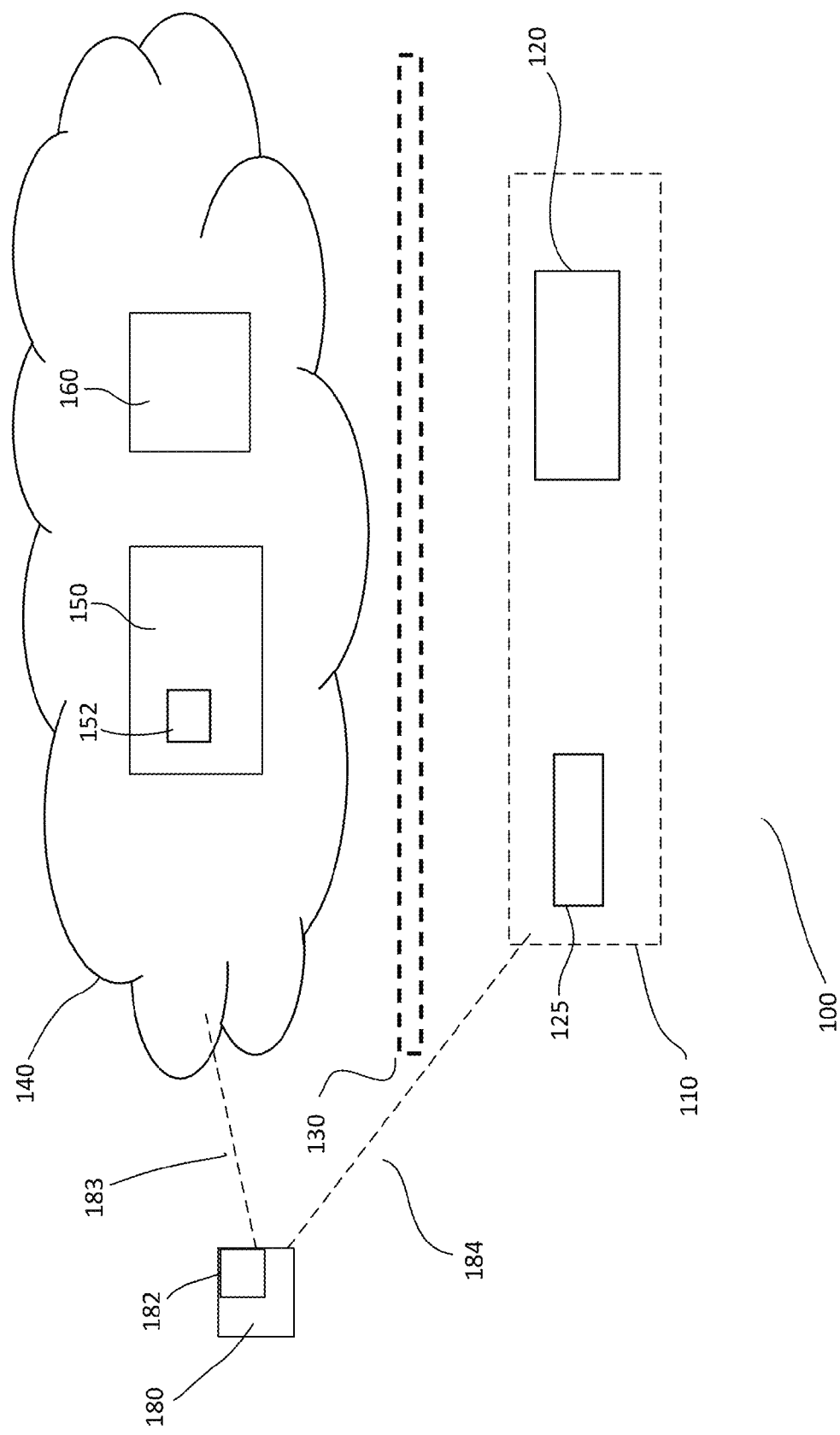
FIG. 1 shows an exemplary implementation of an environment.

FIG. 1 shows a simplified diagram of an exemplary environment or architecture 100. Environment 100 may have a distributed architecture. In one implementation, the environment includes a cloud 140. The environment, for example, includes a cloud computing environment. The cloud, for example, includes interconnected servers. For example, the servers are connected through a communication network. The communication network may be an internet, an intranet, a local area network (LAN), a wide area network (WAN) or a combination thereof. The servers of the cloud may be located in a single or multiple locations.

A server may include one or more computers. A computer includes a memory and a processor. Various types of computers may be employed for the server. For example, the computer may be a mainframe, a workstation, as well as other types of processing devices. The memory of a computer may include any memory or database module. The memory may be volatile or non-volatile types of non-transitory computer-readable media, such as magnetic media, optical media, random access memory (RAM), read-only memory (ROM), removable media, or any other suitable local or remote memory component. The computers of a server are connected through a communication network, such as internet, intranet, LAN, WAN or a combination thereof.

Illustratively, the cloud includes an application server 150 and a resource server 160. The application server is configured to host and process cloud applications 152. The cloud applications (Apps) include web Apps, hybrid Apps or a combination thereof. The application server may also include other types of Apps. The resource server is configured to host additional data or other resources used by the cloud applications. Such hosting and processing may be considered as cloud services provided by the cloud. Various types of cloud services may be provided. The cloud services may be provided in a public, private or hybrid network. The cloud services may be provided by a cloud service provider. For example, the cloud services may be provided by HANA Cloud Platform services from SAP SE. Other types of clouds and cloud providers are also applicable.

The cloud may be accessed by users in a local network 110. The local network may be a private network. For example, the local network may be a network of a private entity, such as a company or an individual home. Other types of local networks are also applicable. For example, the local network may be a virtual private network (VPN).

The local network 110 may include one or more end-user devices 125. For example, an end-user may connect to the cloud using an end-user device. An end-user device may be a local computing device with, for example, a local memory and a processor. The memory may be volatile or non-volatile types of non-transitory computer-readable media, such as magnetic media, optical media, random access memory (RAM), read-only memory (ROM), removable media, or any other suitable local or remote memory component. Various types of processing devices may serve as an end-user device. For example, the end-user device may be a PC, a tablet PC, a workstation, a network computer, a kiosk or a mobile computing device, such as a laptop, a tab or a smart phone. Other types of processing devices may also be used. End-user and end-user device may be used interchangeably. For example, when referring to an end-user, it is understood that the end-user connects to the cloud using a web browser or other software run-time platform (such as Microsoft .NET, Adobe AIR, Android SDK platform, iOS SDK platform and etc.) on various operation systems from the end-user device. The end-user device may be referred to as the client side while the cloud may be referred to as the cloud side.

The local network 110 may also include a local resource server 120. The end-user device and local resource server may be interconnected by a communication network. In one implementation, the local server 120 and end-user device 125 are located on the same premise. Providing the local server and end-user device on different premises may also be useful. For example, the local server and end-user device may be in the same private network but on different premises. In some cases, the end-user device 125 and the server 120 may be the same device or computer. Other configurations of the local resource server and end-user device may also be useful. The local resource server may be referred to as the local server side.

Connection to the cloud may be through the internet. The interconnect connection may be using a mobile telecommunication network, such as a 4G network. Other types of connections to the cloud may also be useful. An end-user may access the cloud by having a cloud account. For example, an end-user may access cloud services by logging onto a user account. An end-user may access a cloud application using, for example, a web browser on the end-user device. When accessed, client side code for the accessed application is loaded to the browser.

For security, a firewall 130 may be present between the cloud and the local network. The firewall, for example, may include application and network firewalls. The firewall ensures that the resources within the local network are inaccessible from outside.

Figure 2:
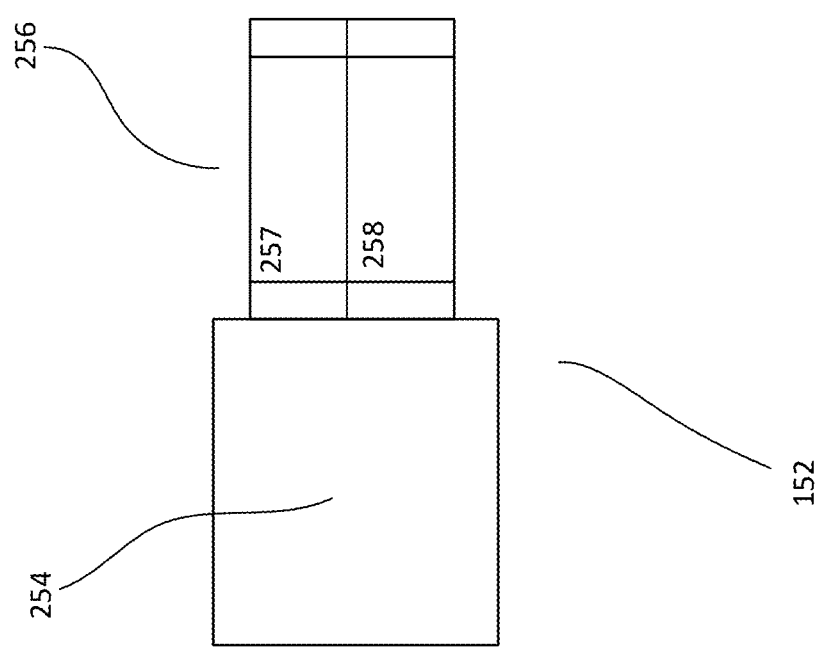
FIG. 2 shows an exemplary implementation of an application.

FIG. 2 shows a block diagram of an exemplary implementation of a cloud App 152 stored in the application server 150 on the cloud. The cloud App, for example, is a hybrid App. Other types of cloud App, such as a web App may also be useful. In one implementation, the cloud App 152 includes a back-end module 254 and a front-end module 256. The back-end module includes the codes for application logics. For example, the back-end module performs the functions of the application. As for the front-end module, it contains or generates the codes and information which are loaded to the client side, e.g. the browser in the end-user device.

In one implementation, the front-end module includes user interface (UI) and resource dispatch sub-modules 257 and 258. The UI sub-module 257 contains the UI of the cloud application which is loaded onto the end-user device. For example, the UI enables the end-user to run the application more interactively.

As for the dispatch sub-module 258, it contains information of the local resource required by the cloud App. The local resource resides on the local server. For example, the dispatch sub-module contains information of how to connect to the local resource. In one implementation, the dispatch sub-module contains the universal resource identifier (URI) of the local resource required by the App. The URI, for example, includes host, port and path of the local resource. Providing other information related to the resource may also be useful. For example, command name and arguments that map to a software/hardware (SW/HW) resource may be provided. This, for example, may include program/file path and execution arguments, a database query, a HW device id and operation arguments.

In one implementation, the dispatch sub-module includes code and information for setting up a secure connection with the local server by the browser. For example, information for setting up a secure connection may include secure access configuration information, such as REST API keys, tokens, passwords or other form of credentials.

Referring back to FIG. 1, the environment 100 includes an application development tool 180 for developing Apps. The application development tool is a software tool for developing Apps. The development tool, for example, is used to develop hybrid Apps. In one implementation, the development tool is an integrated development environment (IDE). The IDE may be a wizard-based IDE. For example, the IDE includes wizards to guide the developer in developing Apps.

In one implementation, the IDE is a web-based IDE. The web-based IDE resides in the cloud, as indicated by dotted line 183. For example, the web-based IDE resides on a server in the cloud. The server on which the IDE resides may be different than the application server 150. The web-based IDE is accessed by a web browser on an end-user device. For example, a developer or end-user may log on to the cloud, accessing the IDE from the web browser of an end-user device. The IDE, for example, may be a SAP River IDE from SAP SE. Other types of IDEs may also be useful.

In another implementation, the IDE may be a local IDE. The local IDE may reside in the local network, as indicated by arrow 184. For example, the IDE may be a native IDE residing on the end-user device. In some cases, the IDE may be a local IDE located on the local server. Other configurations of the IDE may also be useful.

In one implementation, the IDE includes a dispatch information generator (DIG) 182. The DIG is used to generate the dispatch sub-module of the application. During development of an application, the DIG may be invoked to determine information for connecting to the local resource used by the application. For example, information includes location of local resources used by the application. For example, the DIG obtains the URL and other information such as host, port and path of the local resource. Obtaining other information related to the local resource may also be useful. For example, command name and arguments that map to a SW/HW resource may be provided. This, for example, may include program/file path and execution arguments, a database query, a HW device id and operation arguments.

The IDE also generates instructions for the browser to establish a connection to a local resource server containing the local resource. For example, a cross-domain connection is established between the local resource server and the application server, allowing local resource to be available for the application. The connection may be established using technologies such as Ajax, EventSource, WebSocket, JSONP or Frames. Providing connections using other techniques or technologies may also be useful.

Figure 3:
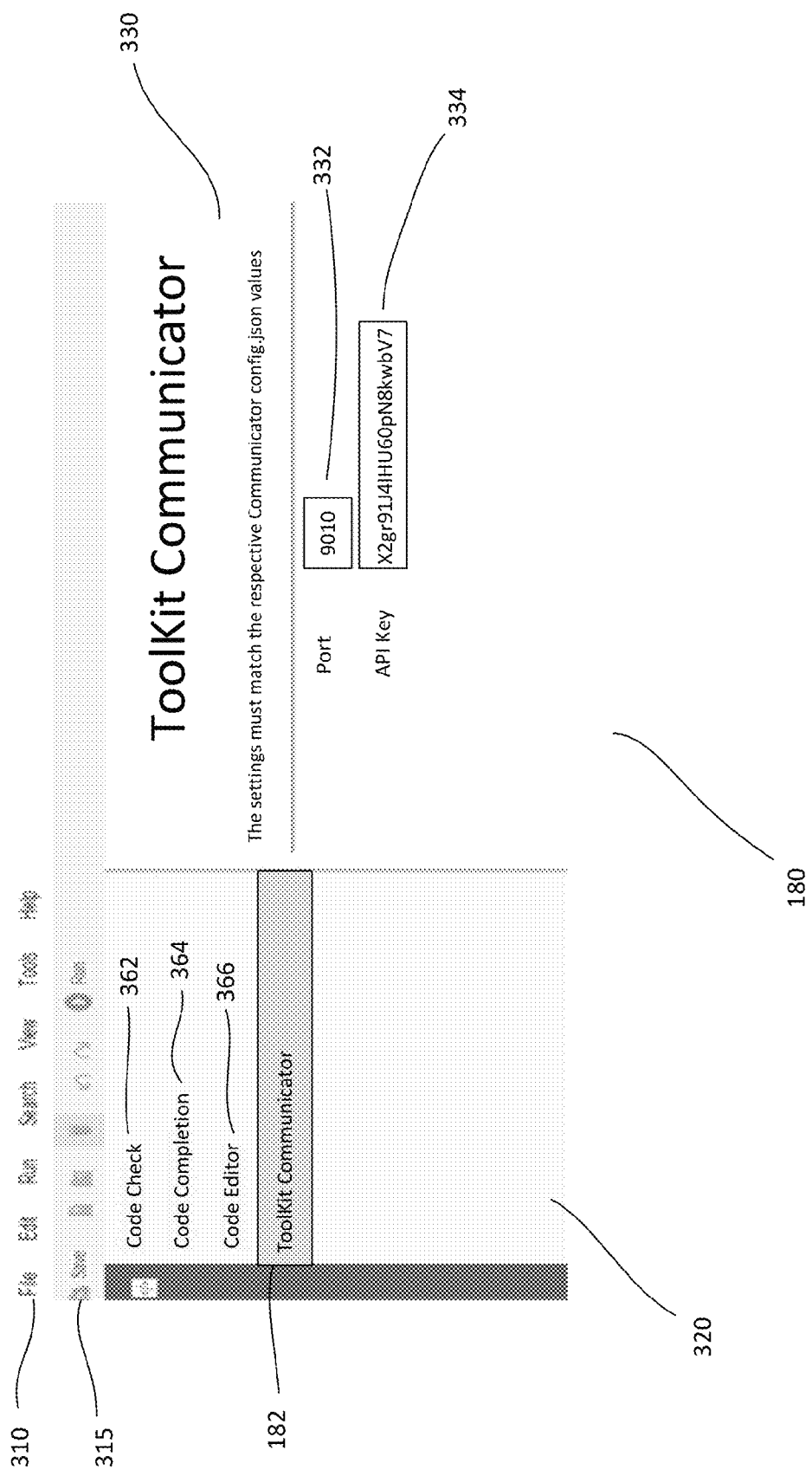
FIG. 3 shows an exemplary implementation of an integrated development environment.

FIG. 3 shows an exemplary implementation of an IDE 180. The IDE includes various pages which are displayed depending on the function selected. A page includes a main menu bar 310 with various functions. A quick menu or tool bar 315 may also be provided. The tool menu bar may be customized by the user to include various commands in the main menu bar. A page also includes a navigation panel 320. The navigation panel includes various functions of the IDE for creating an application. For example, the functions include code check 362, code completion 364 and code editor functions 366. The code editor enables a user to edit source code for the application. The code check function checks the code for errors against syntax or templates while the code completion automatically generates code snippets to assist developers in completing the development.

In one implementation, the navigation panel includes a DIG function 182. As shown, the DIG function is referred to as a Toolkit Communicator. The DIG function is employed to facilitate generating a connection to the local resource server by the application on the cloud server. For example, selecting the DIG function causes the toolkit communicator or DIG function page to be displayed in the function page panel 330. The DIG function page includes entry boxes for providing information of the local resource used by the application. As shown, the DIG function page requests port and API key information 332 and 334 from the user. Providing other information related to the local resource used by the application may also be useful. Based on the user input, the URI can be determined.

As described, the IDE includes a dispatch information generator (DIG) 182. The DIG is used to generate the dispatch sub-module of the application. During development of the application, the DIG may be invoked to determine information for connecting to the local resource used by the application. For example, information includes location of local resources used by the application. For example, the DIG obtains the URI and other information such as host, port and path of the local resource. Requesting other information related to local resource may also be useful. For example, such information may include the command name and arguments that are mapped to a SW/HW resource and the configurations for secure access.

As described, the DIG function is incorporated as part of the IDE. Providing an independent DIG tool or as an add-on to an IDE may also be useful. Other configurations of the DIG may also be useful.

Figure 4:
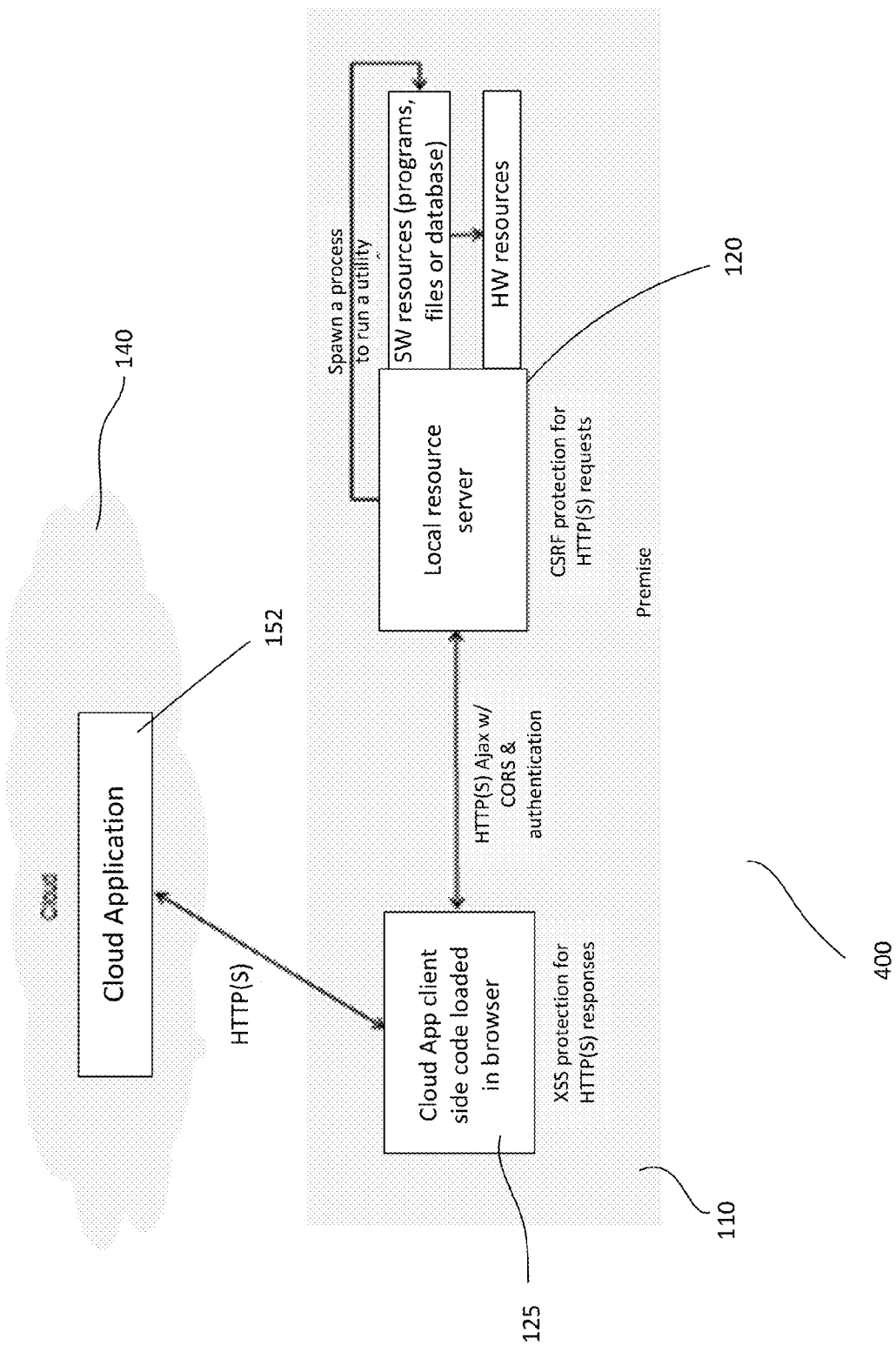
FIG. 4 shows connections of an exemplary environment.

In FIG. 4, an exemplary implementation of an environment 400 with connections is shown. An end-user or client device 125 on local network 110 is used to access a cloud application 152 residing in, for example, an application server on the cloud 140. For example, a browser on the end-user device is used to access the cloud application. The connection between the cloud application and the browser on the end-user device may be achieved with a network protocol such as, for example, a hypertext transfer protocol (HTTP). For example, the communication protocol is HTTPS. Other types of communication protocols between the browser and cloud application may also be useful.

The local network includes a local resource server 120. The end-user device and local resource server, for example, may be located in a local premise. Communication between the local resource server and the end-user device is achieved by a network protocol, such as HTTP or HTTPS. Other types of communication protocols may also be useful. The local resource server contains resource or resources used by the cloud application. The resources, for example, may be software, hardware or a combination of both.

To access a cloud application, an end user may sign in to the cloud through the browser on the end-user device. When accessed, client side codes are loaded into the browser. For example, codes of the client side module are loaded into the browser. The browser may pull the client side codes from the App. The client side module includes, for example, the app UI and dispatch sub-modules. Additional codes may be pushed to the browser.

Using the UI loaded on the browser, the end user may execute the cloud app as desired. For example, the end user may make requests to the application through the browser. Requests, for example, may cause the application to generate information or perform actions. For example, the App may trigger a request. A request may require a resource residing on the local resource server. In such case, connection from the cloud to the local resource server is required. The connection is, in one implementation, through the browser. For example, the browser sends the real request to the local resource server. As such, the connection is from the cloud application to the local resource server through the browser on the end-user device.

Locations of resources used by the application are provided in the dispatch sub-module. For example, locations of the resources located on the resource server are provided in the dispatch sub-module 258. For example, URI and other information of the local resource, such host, port and path, are provided by the dispatch sub-module. Providing other information in the dispatch sub-module may also be useful. Based on the request, the local resource server spawns a process to run a utility. For example, the process provides the information requested by the request.

To enhance security, HTTPS authentication may be employed together with CORS in the case where the resource server has a X.509 certificate. Alternatively, authentication based on public/private key pairs with a common secret and nouce may be employed. Additionally, use of a token makes the local resource server immune to cross-site request forgery (CSRF) attacks for added security. Other types of security, such as XSS may also be useful.

Figure 5:
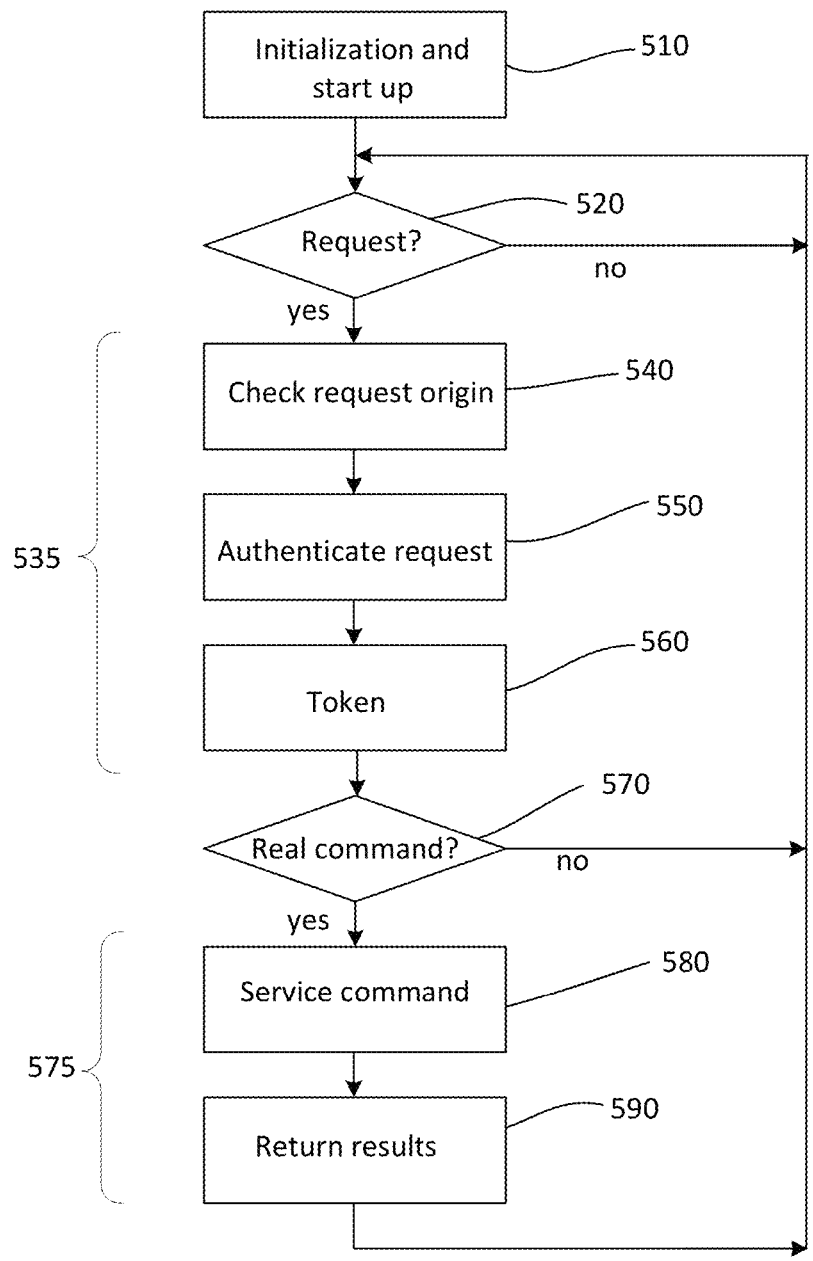
FIG. 5 shows an implementation of a process flow for local resource server servicing request from an end user device.

FIG. 5 shows an implementation of a process flow 500 performed by a local resource server. At step 510, the local server is initialized. In one implementation, initialization includes generating a server key and certificate. For example, when the server is installed, an installer program on the server generates the server key and certificate. The certificate, for example, is a X.509 certificate. Generating other types of certificates or keys may also be useful. Generating the server key and certificate is performed once when the local resource server is installed. When the server is started up, the server key and certificate are loaded onto the server. Loading the server key and certificate may be performed each time the server is started up.

After the server is started, it listens for requests at step 520. The server may listen for requests from a specific port and a network interface. For example, the server may have multiple network interfaces that connect to the network with each interface having its own IP address. For security reason, only certain interface(s) may be allowed to receive requests. If a request is received, the process continues to step 535 for authentication. If no request is received, the process continues to listen for requests.

When a request from a client is received, at step 535, the local server analyzes it to determine if it can service the request. For example, the analysis is a security analysis to ensure that the request from the requestor should be serviced by the local resource server. In one implementation, the analysis process includes multiple processes. For example, the analysis processes includes a validation process 540, an authentication process 550 and a fraud prevention process 560. Performing other types of security analysis may also be useful.

The validation process 540, in one implementation, checks for the origin of the request. For example, the request, which originates from the App on the cloud, sent by the browser is checked for its origination. This is to determine if the request originating from the browser on the client device (client or requestor) from the App in the application server is authorized to access the local resource server. In one implementation, the origin of the request or the requestor is checked using cross-origin resource sharing (CORS). For example, a determination may be made as to whether the requestor is authorized to access the local server. The validation process using, for example, CORS, improves security as compared to if any requestor can access the local resource server. Other types of authorization process may also be useful.

The authentication process 550 is used to authenticate the client request. For example, the authentication process is a secondary security process which is performed. In one implementation, the authentication process may include HTTP Basic Authentication, Digest, client certificate, SAML Token Profile or Hawk authentication. Other authentication processes by the local server may also be useful. For example, if a certificate is not available, authentication can be based on public/private keys.

As for the fraud prevention process 560, in one implementation, it employs cross-site-request forgery (CSRF) protection. For example, CSRF is performed for HTTP(S) requests. CSRF includes generating a token and granting it to the client. The client then sends the request along with the token to the local server.

At step 570, the local server determines if the request from the client is real. For example, if the serer determines that the token is correct and the command in the request is one of the pre-defined commands or a valid command, then the request is a real request. In the case the request is a real request, the process continues to step 575 for servicing by the local server. If the request is not real, the request is rejected and the process returns to step 520.

As discussed, the request is serviced by the local resource server after it has been determined that it can be serviced at step 580. For example, the local server services the command from the client. The local server returns the command outputs and results to the browser and dispatcher at step 590. The outputs and results, for example are displayed by the browser. Thereafter, the process returns to step 520.

Figure 6:
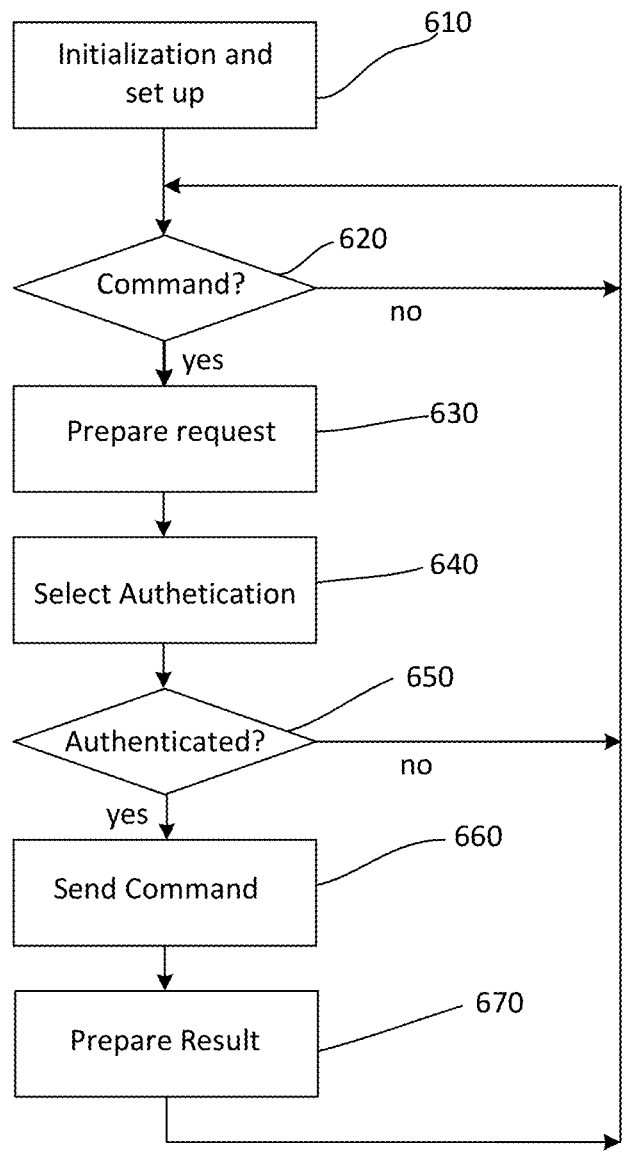
FIG. 6 shows an implementation of a process flow performed by an end-user device.

FIG. 6 shows an implementation of a process flow 600 performed by an end-user device. At step 610, an initialization and set up process is performed. For example, this may include configuring the dispatcher sub-module. The dispatcher sub-module may be configured when the App is created. The dispatcher sub-module is configured to include information of the resources used by the App. For example, the dispatcher is configured to include the URI of the resources. The URI, for example, includes host, port and path of the resources. Providing other information related to the resources may also be useful. This, for example, may include different commands and different command parameters. When a cloud application is accessed by a user, the client side codes are loaded onto the browser in the end-user device. For example, the dispatcher sub-module and application UI are loaded onto the browser on the end-user device.

An end-user may activate or select an App on the cloud. When the App is selected, the dispatcher is loaded onto the browser of the end-user device. At step 620, the dispatcher waits for a command. For example, the dispatcher waits for a command requesting a resource. For example, interaction by an end user with the App causes a request to be issued. The request, for example, includes a command to a resource on the local server.

In one implementation, the request is prepared or processed to produce an initial request at step 630. The request, for example, is processed by the dispatcher via the browser. In one implementation, the browser sets the origin header to the cloud app domain when sending the initial request to the respective resource server.

In one implementation, the dispatcher sets the authentication method for the initial request by the local server at step 640. The authentication method, for example, is set by the developer of the App during configuration of the dispatcher. The initial request is sent to the local resource server, along with the authentication method. For example the request is sent to the local server whose URI is provided in the dispatch sub-module for authentication.

The local server performs authentication. For example, the local server performs an analysis process, as described in step 535 or FIG. 5. Other types of analysis or authentication processes may also be useful. Once the local server authenticates the initial request, it may generate a CSRF token to the client at step 650. Providing other types of security may also be useful. If the initial request is not authenticated, it is rejected and the process returns to step 620.

At step 660, the command is sent to the local server. For example, the dispatcher sends the real command with the granted CSRF token to the local server. Alternatively, the real command may be sent with the security key to the local resource server. The local resource server processes the request and sends the result back to the end-user device. At step 670, the dispatcher prepares the results. For example, preparing the results includes sanitizing received data to avoid cross site scripting (XSS) attacks. For example, sanitization may be achieved through encoding. Other techniques for sanitizing the results may also be useful. After the dispatcher prepares the result, the process returns to step 620, waiting for the next request from the App.

As described, a dispatcher on the cloud App which includes location information of the required local resource is loaded onto the end-user device when the cloud App is accessed. The dispatcher, when loaded onto the end-user device, serves as an interface between the cloud application and local server with the required local resource. This enables the browser on the end-user device to have direct access to the local server when the cloud App is running. As a result, the local resource is accessed without the need of a cloud connector. This enables the local resource to be available to the browser much quicker compared to using a cloud connector.

The application development system may be embodied as an application. For example, the application development system may be embodied as a software application. The different components of the system may be separate software applications configured to operate or interact with each other, whether on the cloud or on the end-user devices. The source code of the applications may be compiled to create an executable code. The codes, for example, may be stored in a storage medium, such as one or more storage disks or in memory of a server and/or end-user devices. Other types of storage media may also be useful.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method of accessing a local resource by a cloud application (App), comprising:
providing a cloud App on a cloud application server on a cloud network, wherein the cloud App requires access to a local server on a local network, the local server comprising a local resource used by the cloud App, wherein the local server is not part of the cloud network, the cloud App includes a dispatcher, the dispatcher includes local access information comprising;
location information of the local server on the local network, wherein the local network is not part of the cloud network; and
connection information for setting up a connection with the local server by the cloud App;
in response to a user accessing the cloud App from a browser on an end-user device, loading the dispatcher onto the end-user device;
issuing, by the dispatcher on the end-user device, a request to the local server for the local resource required by the cloud App; and
receiving, by the dispatcher on the end-user device, from the local server a result of the request.

2. The computer-implemented method of claim 1 wherein:
the cloud App comprises a hybrid application; and
the local server is on a local network, wherein the local network is not part of the cloud network.

3. The computer-implemented method of claim 1 further comprising displaying the result of the request to the local server on the browser on the end-user device.

4. The computer-implemented method of claim 1 wherein the dispatcher comprises a universal resource identifier (URI) of the local resource required by the App.

5. The computer-implemented method of claim 1 further comprising:
developing the App using an integrated development environment (IDE); and
generating the dispatcher for the App by a dispatch information generator (IDG).

6. The computer-implemented method of claim 5 wherein the IDG is a part of the IDE.

7. The computer-implemented method of claim 1 wherein:
the connection information comprises connection information for setting up a connection with the local server; and
communication between the cloud App on the cloud application server and the local resource server is secured.

8. The computer-implemented method of claim 1 further comprising validating the request from the dispatcher by the local resource server.

9. The computer-implemented method of claim 8 further comprising an authentication process to ensure that the request is authenticated.

10. The computer-implemented method of claim 9 wherein the authentication process comprises cross-site request forgery (CSRF).

11. A cloud application on a cloud application server on a cloud network, the cloud application comprising:
a back-end module, the back-end module comprises codes for application logics on the cloud application server; and
a front-end module, wherein the front-end module comprises information loaded to a client side of an end-user device, the front-end module comprising:
a dispatcher sub-module, the dispatcher sub-module comprising local access information comprising:
location information of a local server containing a local resource required by the cloud application, wherein the local server is on a local network, wherein the local network is not part of the cloud network; and
connection information for setting up a secure connection with the local server;
codes for securely generating a request to the local server for the local resource when the cloud application on the cloud application server on the cloud network is accessed; and
codes for securely receiving a result of the request from the local server on the local network which is not part of the cloud network and displaying the result on a browser on the end-user device.

12. The cloud application of claim 11 wherein the front-end module comprises a user interface (UI) sub-module which contains the UI of the cloud application.

13. The cloud application of claim 11 wherein the dispatcher comprises a universal resource identifier (URI) of the local resource required by the App.

14. The cloud application of claim 13 wherein the dispatcher comprises command name and arguments that map to resources on the local server on the local network separate from the cloud network.

15. A system comprising:
a cloud network comprising a cloud application server with a cloud application, the cloud application includes a dispatcher, the dispatcher comprising:
local access information comprising:
location information of a local server containing a local resource required by the cloud application, wherein the local server is on a local network separate from the cloud network; and
connection information for setting up a connection with the local server;
an end-user device, the end-user device includes a browser for accessing the cloud application on the cloud application server on the cloud network;
the local server on the local network which is not part of the cloud network comprises the resource required by the cloud application; and
wherein the dispatcher is loaded onto the end-user device when the cloud application is accessed, the dispatcher issues a request for the local resource on the local network required by the cloud application and displays results of the request on the browser, the dispatcher provides direct access to the local resource on the local server.

16. The system of claim 15 wherein the cloud application comprises a hybrid application.

17. The system of claim 15 further comprising an integrated development environment (IDE) including a cloud-based IDE residing on the cloud.

18. The system of claim 15 further comprising:
an integrated development environment (IDE) for developing the cloud application; and the IDE includes a dispatch information generator (IDG) for generating the dispatcher of the cloud application.

19. The system of claim 18 wherein the dispatcher comprises a universal resource identifier (URI) of the local resource required by the cloud application.

20. The system of claim 19 wherein the dispatcher comprises command name and arguments that map to resources on the local server on the local network which is separate from the cloud network.

* * * * *